Aug. 16, 1966   C. C. RAYBURN   3,267,343
WOUND CAPACITOR AND LEAD ASSEMBLY
Filed March 1, 1965

INVENTOR.
Charles C. Rayburn
BY Robert W. Beart
Don R. Wilson
His Att'ys

United States Patent Office 3,267,343
Patented August 16, 1966

3,267,343
WOUND CAPACITOR AND LEAD ASSEMBLY
Charles C. Rayburn, Falls Church, Va., assignor to Illinois Tool Works Inc., Chicago, Ill., a corporation of Delaware
Filed Mar. 1, 1965, Ser. No. 435,925
5 Claims. (Cl. 317—260)

This invention relates to an improved capacitor assembly and more particularly relates to a capacitor assembly of convolutely wound foil and dielectric having superior bond strength between the capacitor body and the electrical wire leads attached to the margins of the foil strips in the capacitor body. More specifically, the invention relates to a capacitor assembly comprising convolutely wound electrode foil and dielectric film with electrical lead means which are secured to the electrode foil by fusion of the electrial lead means and electrode foil.

In winding capacitor bodies of the type contemplated in this invention, two or more electrode foils are wound with intervening dielectric material so as to electrically insulate the layers of foil from each other. With the intervening layer of dielectric held at a uniform width, successive layers of electrode foil are staggered so that their margins alternately extend beyond opposite edges of the dielectric. In this manner the extending margins of each successive foil layer form opposite ends of the capacitor body.

Prior art capacitors of the foil variety have been characterized by high weight due to general use of tin foil—a tin-lead alloy—in the capacitor body and to soldering or brazing used in joining in the electrical leads to the foil in the capacitor body. Such construction carries the burden mentioned of high weight and is further handicapped by the rather unpredictable nature of the bond developed between the solder and either the capacitor foil or the electrical lead means. To make soldered contact as great as possible an extra large area of contact between the lead wires and the tin foil is maintained by extending the ends of the wire leads to or beyond the edge of the capacitor body. In such cases the ends of the wire leads, that is, those ends not used as the electrical connection but extending beyond the outline of the capacitor body, have to be trimmed which, of course, involves an extra step in manufacturing and also increases the risk of damage in the cutting operation which may inadvertently extend into the capacitor body.

Other problems that are inherently involved in the use of solder in capacitor construction include the fact that solder itself is quite heavy. In addition, during the soldering operation the possibility exists that the solder will provide an electrical connection between successive foil strips and thus destroy capacitor function. In addition, where the capacitor is used in elevated ambient temperatures the solder may migrate and produce an electrical bridge that would destroy the caparitor's effectiveness. Finally, the cost of the solder itself has become a problem as attempts are made to improve the nature of the soldering bond and attendant electrical transmissibility through the use of more expensive solder compositions.

In order to reduce the weight and material cost, attempts have been made to substitute aluminum foil for the tin foil but without substantial success. The particular nature of the surface of the aluminum, which is aluminum oxide because of its being exposed to the atmosphere, makes soldering of electrical lead wires to aluminum inherently quite erratic. As a consequence, aluminum foil has less application in capacitor construction than would be expected in view of the advantages it offers such as light weight and lower cost.

Accordingly, it is an object of this invention to produce convolutely wound capacitor assemblies exhibiting high bond strength between leads and capacitor body.

Another object of the invention is to expand the use of aluminum in wound capacitor construction thereby reducing weight, direct material cost and attendant product handling expenses.

A further object of the invention is to provide a wound capacitor assembly having shorter wire lead lengths.

These and related objects are achieved in the present invention in which the convolutely wound capacitor body is fused to the electrical wire leads in a manner which permits both the use of shorter lead wires and of aluminum foil with an increase in bond strength therebetween, a bond strength not attainable using prior art foil and wire lead materials. By this invention electrical lead means and the foil margins are melted and fused together to produce a superior capacitor assembly.

Detailed description of the invention will be given by reference to the accompanying drawings in which.

Figure 1:
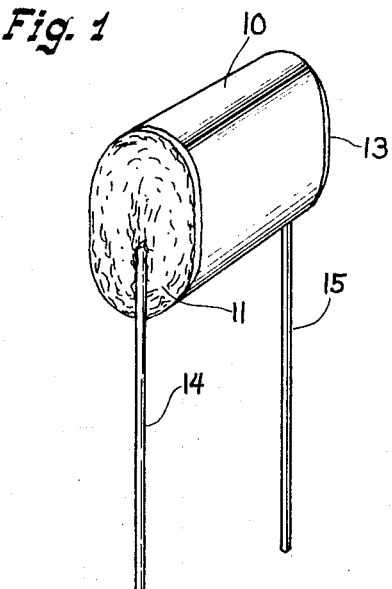
FIG. 1 is a perspective view of the capacitor assembly of this invention showing wire lead means attached to the ends of the capacitor body, the capacitor body having been compressed radially to the winding axis to eliminate the space occupied by the mandrel during the winding operation.

With reference to FIG. 1, the terminal portion of dielectric strip 10 is shown as it overlies conductive foil strip 11 and as it constitutes the exterior surface of the capacitor body prior to the application of any finish coating that may be desired. A second dielectric strip 12, not shown in FIG. 1 but to which reference will subsequently be made, separates the opposite or inner surface of foil strip 11 from conductive foil strip 13 which in turn is separated from foil strip 11 by dielectric strip 10 after the laminate of alternate dielectric and foil strips has been convolutely wound. Lead wires 14 and 15 of any conventional metal or combinations of metals having good electrical conductivity are fused by the application of heat to foil strips 11 and 13, respectively.

Detailed description of method and apparatus for fusing electrical lead means with the foil by percussive welding are set forth in copending application Serial No. 441,774 filed March 22, 1965. In essence the method, as performed by the related apparatus, comprises connecting capacitor banks to the electrical lead means, charging the capacitor banks and moving the lead means in correct relationship toward the end of the capacitor body to which the lead means is to be joined by fusion. The capacitor body is connected into the electrical circuit which is completed as the electrical lead means closely approaches the capacitor body. At that point electrical energy stored in the capacitor banks arcs across the air gap producing intense heat and melting on the surfaces of the wire lead means and the electrode foil in the capacitor body. Continuing movement of the wire lead means brings the wire and the margins of the electrode foil together while the surfaces are still in the melted state. Molecular mixing or fusion of the two occurs followed instantaneously by cooling of the materials sufficient to return them to the solid state resulting in a strong bond between the lead means and the foil. With suitable means for controlling movement of the electrical lead means and thereby controlling the arcing it is theoretically possible to simultaneously connect the two lead means to the capacitor body but from a practical standpoint the method attaches one lead means and then repeats the process for the second.

Figure 2:
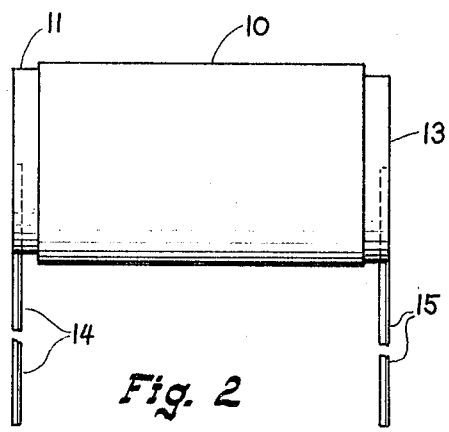
FIG. 2 is a side view of the capacitor assembly showing the wire leads attached to the edges of the foil strips, these electrical lead means in the course of being moved into contact with and being fused with the edges of the foil being also pressed within the outline of the ends of the capacitor body.
Figure 3:
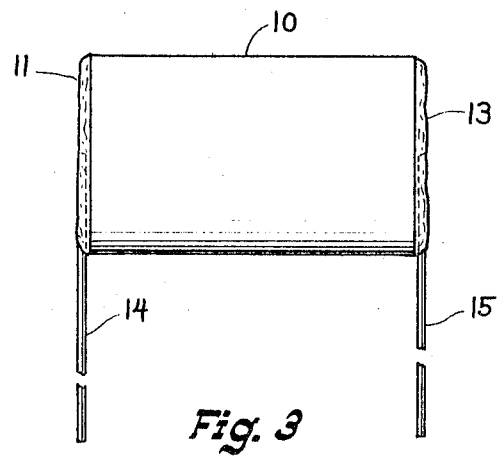
FIG. 3 is a similar side view of the capacitor assembly which has been tamped axially of the capacitor body so as to compress the margins of the foil strips, the electrical lead means being further pressed within the final configuration of the ends of the capacitor body.

The continuing movement of the electrical lead means places the lead means within the outline of the capacitor body as shown in FIG. 2. As a result, fusion of the wire leads with the foil occurs over approximately 180° of the circumferenece of the wire lead means. The staggered position of foil strips 11 and 13 can be seen in FIG. 2, this staggered positioning meaning that the two foil strips alternately extend margins beyond opposite edges of the intervening dielectric strips, one of which is strip 10. Fusion of wire lead means 14 and 15 to the foil strips 11 and 13 occurs in portions of the margins of the foil and is not limited to the edges only, the margins being those portions of the foil strips which extend beyond the edges of the intervening dielectric strips. In FIG. 3 wire leads 14 and 15 are fused to the margins of the foil strips 11 and 13 as in the case of the assembly shown in FIG. 2. However, after the lead means are connected by fusion to the margins of the foil, tamping axially in line with the winding axis of the capacitor body extensively compresses the margins of the electrode foil.

Figure 4:
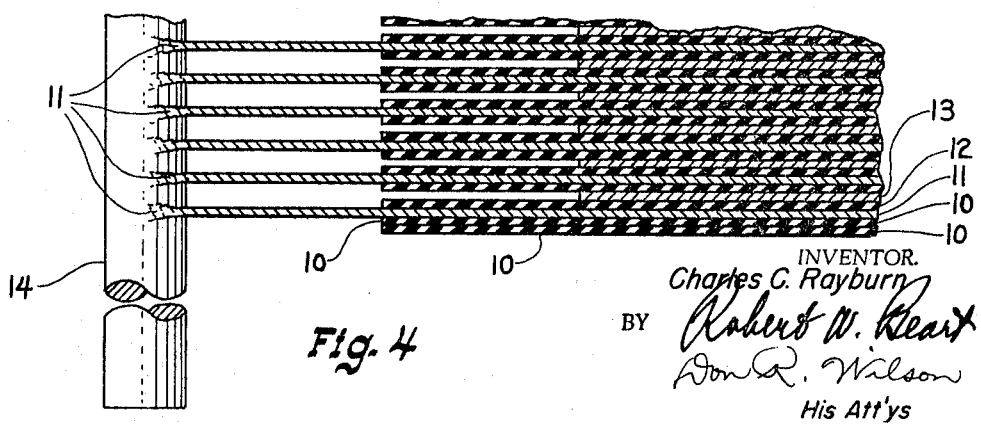
FIG. 4 is a partial sectional view on an enlarged scale of a segment of the capacitor assembly showing in greater detail the alternate layers of foil strips and dielectric strips with the electrical lead means attached by fusing of the wire lead with the edge of the foil strips.

Capacitor assembly construction according to this invention can be seen in greater detail in FIG. 4 which shows the electrical wire lead means 14 joined by fusion to the margins of electrode foil 11 prior to axial tamping of the completed capacitor assembly. FIG. 4 is not drawn to scale but is intended to approximate the relative positions but not dimensions of the electrode foil, dielectric and electrical lead means. The lowermost of the strips making up the capacitor body is dielectric strip 10 shown here as a single exterior layer whereas in general it will be of sufficient extra length as to constitute several concluding turns and therefore several exterior layers of the capacitor body.

Similarly, the representation in FIG. 4 of the margins of electrode foil 11 is not precise in that there will be, of necessity, extensive deformation of the margins in the course of moving electrical lead means 14 into position to be fused to foil 11. Only needlessly precise control of the movement of lead means 14 would produce a fusion of it and foil 11 without folding and bending of the foil strip margins. Furthermore, in any capacitor body, deformation of the margins may occur to some degree, either intentionally or in the course of ordinary preliminary handling, so that fusion of the lead means to the foil will consist of fusion to the edges and to the margins at points other than on the edge.

The staggered arrangement of alternate layers of electrode foil 11 and 13 can also be seen in detail in FIG. 4, the length of the margin of foil 11 (that portion of the foil extending beyond the edges of dielectric strips 10 and 12) being essentially equal to the distance which electrode foil 13 is recessed or indented due to the fact that its margin extends beyond the other edges of the same dielectric strips to form the opposite end of the wound capacitor body not shown in FIG. 4.

The extent and manner of melting and resultant fusion will depend in part on the particular materials being used as the foil and as electrical lead wires. In general, due to its good electrical conductivity and relatively low cost, copper wire is the conventional choice for lead means. Two fabricated forms of copper which have received wide acceptance as electrical leads and which have been used very successfully in the practice of this invention are steel cored copper wire in which about 40 percent of the total cross-section is copper with the remainder being steel and, as a second form, 31-mil "half-hard" copper wire which is copper wire that has been work hardened to some extent. Either of these forms of copper wire may have a coating of tin-lead alloy on the order of one-third mil in thickness.

Fusion between the wire leads and the conductive foil strips requires heat sufficient to produce some melting generally but not necessarily some melting of both the lead means and the foil so that molecular mixing can occur. The amount of heat required will therefore depend in part on the particular materials being joined as has been earlier indicated. Some regard must be given to heat sensitivity of the dielectric strips because many of these dielectric materials will melt at relatively low temperatures. However, where fusion of the metallic members is accomplished by percussive welding the heat is very highly concentrated in the areas to be fused and can therefore be kept at minimum. Moreover, the relatively large surface areas of the margins of the electrode foil give the convolutely wound capacitor body some characteristics of cooling fins permitting rapid dissipation of heat to the surroundings. In general, any of the conventional plastic dielectric tapes used in wound capacitors such as polyethylene terephthalate or the fluorocarbon resins are completely satisfactory.

In this capacitor assembly having capacitor body and wire leads fused together, breaking strength of the bond between the wire lead and the foil in the capacitor body is higher than the tear strength of the foil. In this improved capacitor assembly any deliberate effort to remove the electrical wire leads results in tearing of the foil near the line or point at which the fusion occurs with no separation between the wire lead and the electrode foil. Electrical lead means fused by percussive welding to aluminum foil which is noted, as indicated earlier, for being difficult to join leads to by soldering, produce a junction far stronger than the same lead means soldered to tin-lead foil. Most remarkable is the fact that this bond between the electrode lead means and the aluminum is so strong per unit of contact area that the present day method of soldering the wire lead along the entire length of the longest dimension of the end of the tin-lead foil capacitor body can be replaced by fusion of the same wire lead material to aluminum along a length of wire lead extending over only one-half or even less of the longest dimension of the same size capacitor body.

By permitting the electrical lead means to extend radially from a point corresponding to or near the winding axis instead of requiring the lead means to bisect the end of the capacitor body according to the prior art a substantial savings in wire is possible. Where the total length of lead means is on the order of 2 inches, a savings of one-quarter inch or more on each of the two lead means is a large proportion, this savings being accomplished while holding strength is being increased, a holding strength of particular value in permitting the joining of wire leads to aluminum.

As indicated earlier, the novel capacitor assembly of this invention comprising a capacitor body containing aluminum foil is approximately one-third as heavy as the same size capacitor assembly made of tin-lead foil because of aluminum's lighter weight and because of the lesser lead means length. The lower price for aluminum foil and attendant lower shipping and handling costs substantially reduce costs of the instant capacitor assembly in comparison with the related prior art assembly.

For certain applications capacitor assemblies must pass a flame test which consists of three cycles of 15 seconds in a gas flame and 15 seconds out of the flame, no sustained flame from the assembly being permitted after the third cycle. The tin-lead alloy of the related prior art capacitor assemblies generally fail this test because the dielectric film on and near the outer surface becomes hot and melts and starts burning. The same test applied to the capacitor assembly of the invention produces no burning because the aluminum is a very good thermal conductor whereas the tin-lead alloy is not. As a result, concentrations of heat at or near the surface are eliminated.

Although the invention has been described by references to specific embodiments it can be readily recognized that many modifications are possible and accordingly the broader concepts of the invention are not to be restricted except to the degree required by the prior art and by the following claims.

I claim:
1. A capacitor assembly comprising a capacitor body of dielectric material and electrode foil strips convolutely wound relative to the dielectric material in capacitive relationship, said foil strips being staggered to extend beyond opposite edge boundaries of said dielectric material, and radially directed electrical lead means traversing a plurality of foil strips and at least partially embedded beneath opposite marginal edge portions thereof to expose a substantial area of the lead means to the foil strips, said lead means being in fused engagement with said foil strips substanatially throughout the embedded area so as to be directly supported by said foil strips while providing either direct contact with or very close positionment of said foil strips and lead means to each other whereby a superior electrical and physical connection between the lead means and foil strips is provided.

2. The capacitor assembly as defined in claim 1 wherein said capacitor body includes at least two convolutely wound electrode foil strips and an equal number of dielectric strips separating the foil strips.

3. A capacitor assembly as defined in claim 1 in which said electrode foil strips are made from aluminum.

4. The capacitor assembly as defined in claim 1 wherein the radially directed electrical lead means are joined to the foil strips beginning from the winding axis of the foil strips and extending radially outwardly therefrom and contacting substantially every winding of the electrode foil strips at one point only.

5. The capacitor assembly as defined in claim 1 wherein said electrical lead means are substantially cylindrical in character and contact the foil strips when embedded therein throughout an arcuate area thereof.

References Cited by the Examiner
UNITED STATES PATENTS

| | | | |
|---|---|---|---|
| 1,619,201 | 3/1927 | Fried | 317—260 |
| 2,101,896 | 12/1937 | Burlingame | 317—260 |
| 2,872,630 | 2/1959 | Cummin | 317—260 X |

FOREIGN PATENTS 692,608  6/1953  Great Britain.

LEWIS H. MYERS, *Primary Examiner.*

ROBERT K. SCHAEFER, *Examiner.*

E. GOLDBERG, *Assistant Examiner.*